US012337269B2

(12) United States Patent
Sisk et al.

(10) Patent No.: US 12,337,269 B2
(45) Date of Patent: Jun. 24, 2025

(54) VACUUM FILTER ASSEMBLY FOR PROCESSING BULK GRANULAR MATERIAL AND FILTER MOUNTING ASSEMBLY THEREFORE

(71) Applicants: David E. Sisk, Bonne Terre, MO (US); Peter Kemp, Crestwood, MO (US); Roger Breakfield, Farmington, MO (US); Andrew Boyer, Bonne Terre, MO (US); Travis Kinneman, Fredericktown, MO (US)

(72) Inventors: David E. Sisk, Bonne Terre, MO (US); Peter Kemp, Crestwood, MO (US); Roger Breakfield, Farmington, MO (US); Andrew Boyer, Bonne Terre, MO (US); Travis Kinneman, Fredericktown, MO (US)

(73) Assignee: Bulk Tank, Inc., Park Hills, MO (US)

( * ) Notice: Subject to any disclaimer, the term of this patent is extended or adjusted under 35 U.S.C. 154(b) by 358 days.

(21) Appl. No.: 17/803,420

(22) Filed: Jun. 28, 2022

(65) Prior Publication Data

US 2023/0072328 A1 Mar. 9, 2023

Related U.S. Application Data

(63) Continuation-in-part of application No. 17/803,366, filed on May 28, 2022, and a continuation-in-part of
(Continued)

(51) Int. Cl.
*B01D 46/24* (2006.01)
*B01D 46/00* (2022.01)
(Continued)

(52) U.S. Cl.
CPC ..... *B01D 46/2407* (2013.01); *B01D 46/0005* (2013.01); *B01D 46/0041* (2013.01);
(Continued)

(58) Field of Classification Search
CPC ............ B01D 46/2407; B01D 46/0005; B01D 46/02; B01D 46/0004; B01D 46/0002;
(Continued)

(56) References Cited

U.S. PATENT DOCUMENTS 3,615,256 A * 10/1971 Miller .................. C07C 51/573
55/428
5,053,063 A 10/1991 Sisk
(Continued)

*Primary Examiner* — Frank M Lawrence, Jr.
(74) *Attorney, Agent, or Firm* — Sandberg Phoenix & von Gontard P.C.

(57) ABSTRACT

A dust filtering and collection system for filtering dust and other debris particles from an incoming dust laden air stream, such air stream generally being used for conveying granular material into or from a bulk tank trailer, a railroad car, or other conveying vehicle, the filtering system designed to be functioned by vacuum air pressure, operatively generated by a blower, to draw in the soiled air into the filter system, to cleanse such air for further use in the conveying of the granular material. The air flow may be reversed, to provide for a dislodging of any dust particles from the filtering system, and to cleanse the filter for further efficient usage of the system in conveying granular material into or out of the tank trailer, or other vehicle during usage. The filter system includes a pod of filter tubes encapsulated by a polymer header that mounts to a transverse plate that secures to the approximate upper end of the filter canister of the filtration system.

16 Claims, 8 Drawing Sheets

Related U.S. Application Data application No. 17/300,958, filed on Dec. 22, 2021, now abandoned, and a continuation-in-part of application No. 17/300,841, filed on Nov. 22, 2021, now abandoned.

(60) Provisional application No. 63/361,510, filed on Dec. 30, 2021, provisional application No. 63/259,681, filed on Aug. 3, 2021, provisional application No. 63/259,241, filed on Jun. 29, 2021, provisional application No. 63/205,694, filed on Jan. 4, 2021, provisional application No. 63/205,346, filed on Dec. 3, 2020.

(51) Int. Cl.
  *B01D 46/42* (2006.01)
  *B01D 46/71* (2022.01)
  *B65G 53/60* (2006.01)
  *B65G 69/18* (2006.01)

(52) U.S. Cl.
  CPC ..... *B01D 46/4254* (2013.01); *B01D 46/4272* (2013.01); *B01D 46/71* (2022.01); *B65G 53/60* (2013.01); *B65G 69/181* (2013.01); *B01D 2265/06* (2013.01); *B01D 2267/30* (2013.01); *B01D 2267/60* (2013.01); *B01D 2273/28* (2013.01)

(58) Field of Classification Search
  CPC ........ B01D 46/04; B01D 46/24; B01D 46/66; B01D 46/70; B01D 46/0041; B01D 46/4254; B01D 46/4272; B01D 46/71; B01D 2265/06; B01D 2267/30; B01D 2267/60; B01D 2273/28; B01D 2265/024; B01D 2271/02; B01D 46/58; B01D 50/20; B01D 45/16; B65G 53/60; B65G 69/181
  USPC ..... 95/273, 278, 279; 55/502, 301, 302, 303
  See application file for complete search history.

(56) References Cited

U.S. PATENT DOCUMENTS

| | | | |
|---|---|---|---|
| 6,350,290 B1* | 2/2002 | Nadeau | B01D 46/2407 95/280 |
| 6,551,368 B1* | 4/2003 | Kordas | B01D 46/4281 95/280 |
| 8,657,898 B2 | 2/2014 | Sisk | |
| 2013/0220125 A1* | 8/2013 | Heidenreich | B01D 46/71 95/280 |

\* cited by examiner

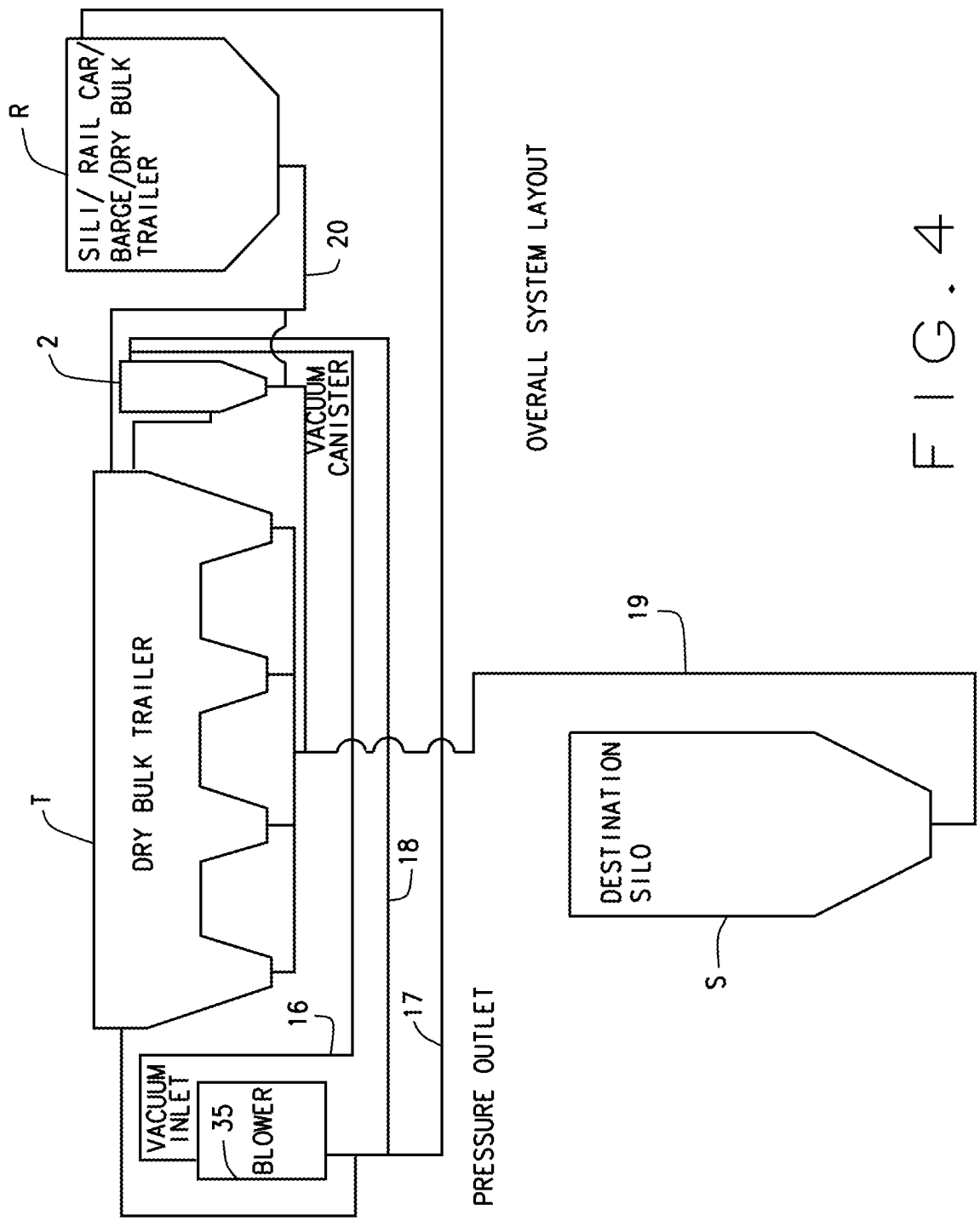

VACUUM FILTER ASSEMBLY FOR PROCESSING BULK GRANULAR MATERIAL AND FILTER MOUNTING ASSEMBLY THEREFORE

CROSS REFERENCE TO RELATED APPLICATIONS

This application is the non-provisional for the application filed under Ser. No. 63/259,681, filed on Aug. 3, 2021; this application is related to and comprises a continuation-in-part of the patent application having Ser. No. 17/300,958, filed on Dec. 22, 2021, which is the non-provisional for the provisional application filed under Ser. No. 63/205,694, filed on Jan. 4, 2021; and this application is a continuation-in-part of the application having Ser. No. 17/300,841, filed on Nov. 22, 2021, which is the non-provisional for the application having Ser. No. 63/205,346, filed on Dec. 3, 2020; and this application is a continuation-in-part of the patent application having Ser. No. 17/803,366, filed on May 28, 2022, which is the non-provisional for the application having Ser. No. 63/259,241, filed on Jun. 29, 2021; and this application is related to the provisional application having Ser. No. 63/361,510 filed on Dec. 30, 2021.

FIELD OF THE INVENTION

This invention relates to a vacuum filter assembly for processing bulk granular material, wherein the filtering assembly cleanses the air that is utilized in facilitating the conveyance of the granular material, during its processing, and provides a system for passage of pressurized or vacuumed air to provide for conveying of such materials, or for cleansing of the filter assembly utilized in the process; and the invention pertains to a novel method for pod mounting of the filter assembly, and its various filtration tubes, within the system, in application for its usage to facilitate the conveyance of the granular material during its processing. The invention also discloses a means for automating the control of the various valve systems that are associated with the filtration assembly, during its operations.

BACKGROUND OF THE INVENTION

The present invention relates to the filtering of the pressured or vacuumed air utilized in the conveyance of bulk materials, the various air conveying components that are integrated into the air filtering and conveyance system, the improved means for mounting of the various filters within the filtering assembly, and the automating of the various valves that are utilized in the processing and cleansing of the air being used for conveying of the granular material, and the means for cleaning the filter assembly, in the event that it becomes clogged with dust and debris from its processing air, during extended usage within the overall system.

In previous filtering devices, utilized in the conveyance of granular material, as for example, from the silo, or other storage bin, to a conveying vehicle, such as a tank trailer, or railroad car, various types of filtering of such air that is utilized for conveying purposes, are generally designed for achieving efficiency and separation of dust and debris particles from the air being filtered, and for subsequent usage of such cleansed air for conveying the granular material, either from storage, or to the site of usage, such as when such material is utilized as an ingredient in food products, and the like. The purpose of maintaining the air used for conveying purposes to a degree of purity and cleanliness, in the conveyance of such grains or other granular materials, for the use in the preparation and application of the formation of food products, or other related components, for example, such as in polymer containers or related products, it is required that such grains and granular materials be maintained in a thoroughly cleansed state, and not adulterated by any dust or debris that may enter into the conveyance system, and particularly the pressurized air that is used to undertake such transfer of these materials, during their processing. More specifically, in the dry bulk conveyance of granular material, such as the identified grains, flour, or the like, where various pressurized or vacuuming air lines are generated to provide for the conveyance of such materials, as to and from the storage, silos, or conveying bins, such grains, as may be moved to a tank trailer, railroad car, or other dry bulk trailers, it is highly essential that cleanliness of the air being utilized in such a conveyance system being highly sanitized, so as to avoid adulterating of the transported grains, and eventually, in most instances, as they will be utilized in the processing of foods, or even other products, such as the polymer pellets that may be processed into products, such as milk cartons, and the like, it is absolutely essential that cleanliness be maintained, so as to avoid the contamination of the end products, or other types of products being processed or manufactured from such granular materials. Current codes and regulations require such.

The present invention relates to both the system and processing for the vacuum filtering of such conveying air, and more particularly to the specific structures for the various components that form the filtration system, and to provide for its functionality, and normally good usage of a singularly air transferring blower, to assure that it maintains efficiency of operations, throughout the useful life of the system, so as to comply with any and all such regulations that may be enforced, pertaining to the handling of such type of granular materials, particularly during their conveyance and transfer.

More specifically, with respect to the current invention, and that is for use within the system including its filtration canister, and the air line system that is provided for the air to be processed, transferred, either under pressure or vacuumed low pressure, it is desired to convey the air from the silo, or other storage facility, holding the grains or granular material, into the filter housing, in order to cleanse such air and purify it for further usage, and wherein the filter housing incorporates a plurality of securely mounted filtration tubes, for use within the overall filtration system. Normally, in the prior art, such filtration tubes were normally supported at their upper ends by a transverse plate, while the lower ends of such tubes were cripped or sealed into closure, and these tubes are made generally of a polymer that incorporates very miniscule openings through them, in the range of microns of measurements, so as to filter the blower attracted incoming air as it passes through the tubes in the filtration system, and to purify it for further usage in the air conveying of such granular materials, during its handling. And, for such filtration system, within their filter housing, includes such a transverse plate, and in which the various tubes are mounted, they usually are each held in place by grommets, that are pressured into position, but it has been found, that these prior art types of filters, when the dust or other fine debris clogs up the miniscule opening through such tubes, and the pressure of the incoming air may be in the range of 20-30 psi, on occasion would force the tubes upwardly, and out of the mounting from their engaged grommets, as held within the associated transverse plate, thereby providing a direct opening for passage of the dust soiled air out of the filtration system, bypassing it, and delivering completely adulterated air, which means that it is inadvertently utilized for conveying the granular material and leading to a complete failure of the identified type of air filtration system. Such a filtration system can be seen in the assignees prior U.S. Pat. No. 5,053,063, as can be noted therein.

This previous U.S. Pat. No. 5,053,063, upon the dust filtering and collection system, as noted, shows the overall assembly of the prior art type of assembled structures that make up the storage tank of the dry bulk trailer, including an elongated storage tank, the dust filtering and collection canister associated therewith, and its filtration tubes that are provided within the canister, in addition to the flow passage or the various air lines that provide for conduct of the dust laden air stream into the filtering canister, and then through the filtration device, and the other flow lines associated with the conveyance of the purified air to the primary discharge line that utilizes such pressurized air to convey the granular material or grains for loading onto the tank trailer, or railroad car, or to the site of usage or storage for such conveyed materials. That previous disclosure provides an overall analysis of the bunk tank vehicle storage tank, and its various air conveying lines, and the filtration devices used herein, during its processing of granular materials.

Other Untied States patents, even one to the inventors herein, U.S. Pat. No. 8,657,898, also depict an air filter spin flow type of housing, which shows a separate type of structure for filtering of the air used in the conveying of bulk granular material from a tank trailer, such as the type that also uses air pressure to achieve granular or grain flow, and its distinct air filtration unit that incorporates an intake that includes, in that instance, a spiral type of air flow, upon entering the associated filtering device.

These are the pertinent prior art types of patents that are known to the inventors herein, and these show various filtration systems, that are designed for aiding and cleansing of the air, through a filtration canister and the system in which it locates, in order to provide for that clean air for use in the conveyance of the bulk granular material being conveyed and processed.

SUMMARY OF THE INVENTION

The concept of this invention is to provide for improvements in the structure and functionality of the filtration system used in combination with a tank trailer, or other granular materials conveying vehicle. In this instance, the filtration system includes the filter canister, that incorporates a plurality of filtration means, in the form of filter tubes, but the tubes rather than being individually mounted within the canister, are arranged in pods, each pod having a plurality of filtration tubes, so that when replacement or clean out is required of the various tubes, after prolonged usage, and when they may become clogged, a pod of such tubes may be removed, as a collection, and replaced with a clean filtration pod of tubes, in a very prompt manner. Thus, such procedure eliminates the need to replace what may be hundreds of individual filtration tubes, from the canister, during its revitalization.

Another enhancement of this invention is the means for formation of the pod of filtration tubes, through the use of a polymer formed mount, or where such plurality of filter tubes are encapsulated within the polymer potting material, when forming the functional pod, that may be easily inserted within the top lid or plate of the filter canister, when installed, or when facially removed, as when being serviced.

The further advantage of the current invention is the application of various mechanical, electrical, or electronic actuators, that are operatively associated with each of the various valves that are integrated into the conveying lines that provide for the processing of the granular material, the cleansing of the air used in this forced air conveying system, so that all of these various controls can be either manually actuated, or electronically actuated, as from within the vehicle cab, or other convenient location, readily exposed externally of the bulk tank conveyor, and which the operator can conveniently obtain access to, for providing for automatic control and Operations at the various sequences used in the processing of the air, its cleaning, its exhaust, the disposal of any collected dust or debris, or in the initiation of the conveyance of the granular material through the efforts of the highly pressurized cleansed air that is used in the transfer of such granular material to and from the conveying vehicle, or to and from its silo, or the area of its usage for the further processing of such materials.

Furthermore, the concept of this invention provides for the integration of all the various conveying lines, with the single filtration canister, and these may include the vacuum connection to the canister, the connection to the trailer aeration line, the conveying line that delivers the soiled air to the filtration canister, for filtering purposes, even a dust removal collection line usually at the bottom of the canister, and the various valves and back flush valving that allows for the cleansing of the filtration tubes, after their prolonged usage, and when dust may have accumulated within its miniscule filtration structure. Furthermore, the connection lines include the removal of the cleansed fresh air of the upper portion of the filtration canister, and its conveyance to the usual blower that provides for increasing the pressure of the cleansed air, for use for the conveying of the granular material, either to or from the bulk tank, or other conveying vehicle.

These are an example of the variety of enhancements that have been added into the vacuum filtering of this invention, and its assembled structure, for ready installation to the tank trailer, in preparation for its operation and usage within the conveying system for granular materials, and described.

Thus, the principal object of this invention is to provide an assembly of conveying means, in the way of granular materials conveying lines, that are operatively associated with a filtration canister, that includes a variety of air conveying lines, dust collection conduits, clean air conveying line leading from the filtration canister, all of which are interconnected together to provide a unified structure for a filtration system for use in combination with the loading and unloading of a bulk tank transfer vehicle, or other granular material conveying vehicles.

A further object of this invention is to provide a filtration system, including a filter canister, that mounts generally at its upper segment a polymer formed mount that may hold one or more pods of air filtration tubes, where the pods may be removed, separately, for the replacement of a plurality of their supported filtration tubes, operatively associated with each pod, as mounted within the upper regions of the filtration canister of this invention.

A further object of this invention is to provide the automation means, whether it be mechanical, electric, or electronical controlled, even through the usage of a computer, to provide the means for functioning of the various valves or butterfly valves that are operatively associated at select locations of the air or product conveying lines, associated with the filtration device, so that the operator may control the entire operations of the loading or unloading systems of the tank trailer, from one location, whether it be within the cab of the vehicle, or exteriorly provided conveniently upon a lateral or other location associated with the granular material processing of the associated bulk material tank trailer.

A further object of this invention is to provide a mounting means for the various pods of filtration tubes, within the upper region of the filtration canister, which can be conveniently located for access upon removal of its high pressure cover, as during servicing of the filtration system for the bulk materials tank trailer or other vehicle.

These and other objects may become more apparent to those skilled in the art upon review of the Summary of the Invention as provided herein, and upon undertaking a study of the Description of its Preferred Embodiment, in view of the Drawings.

BRIEF DESCRIPTION OF THE DRAWINGS

In referring to the drawings:

FIG. 4 shows a schematic of the various components of the overall system as operatively associated with the filter assembly, including its dry bulk tank trailer, the air vacuuming canister, the blower that attracts the air into the system, their interconnection with a silo, rail car, barge, or other dry bulk transfer trailer, and how the entire system, when unloaded, further connects with the destination silo or other storage means;

DESCRIPTION OF THE PREFERRED EMBODIMENT

Figure 1:
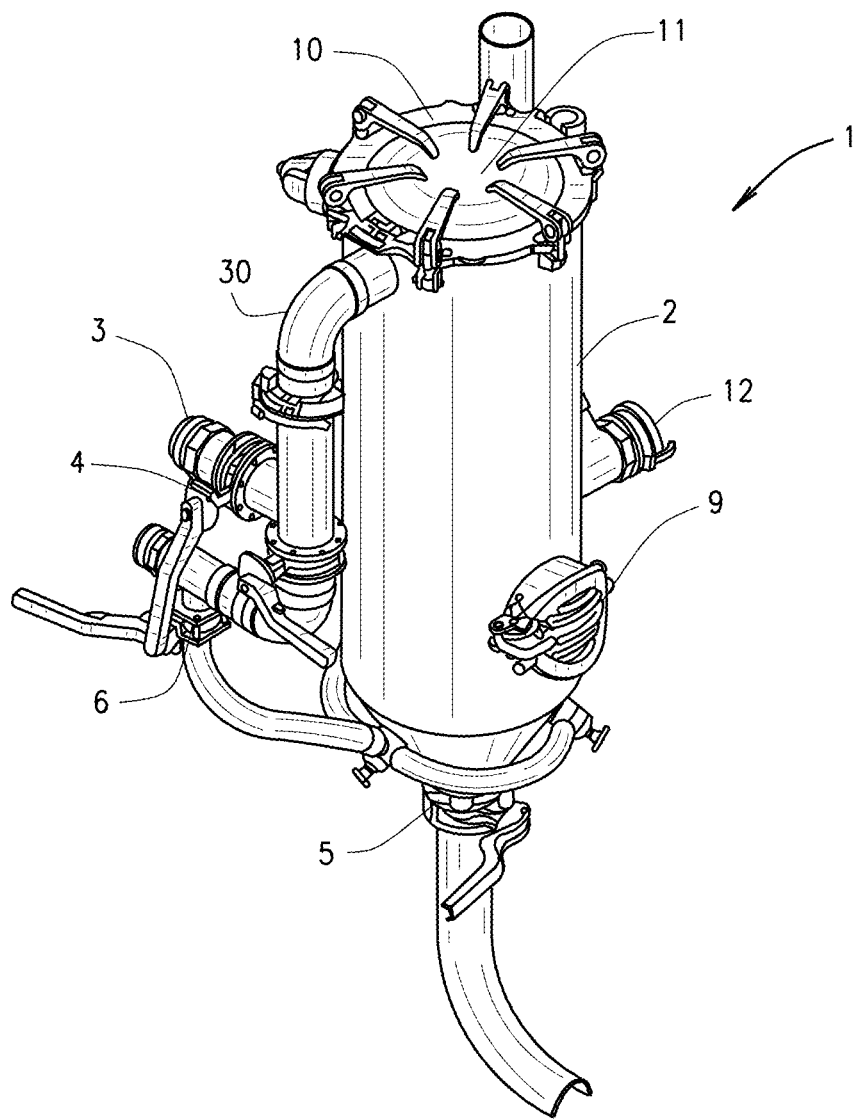
FIG. 1 provides an isometric view of the vacuum filter assembly of this invention, with its various connecting air and dust conveying lines, as operatively associated therewith.
Figure 3:
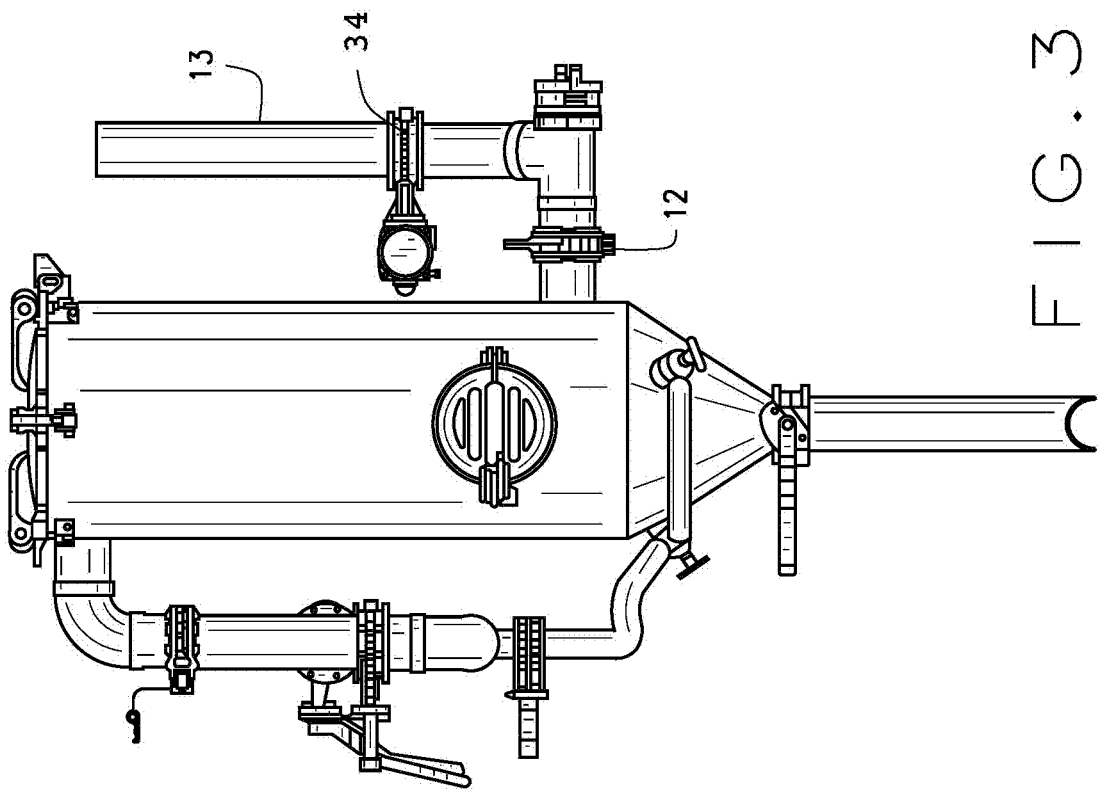
FIG. 3 is a right side view of the filter assembly, of FIG. 1.
Figure 2:
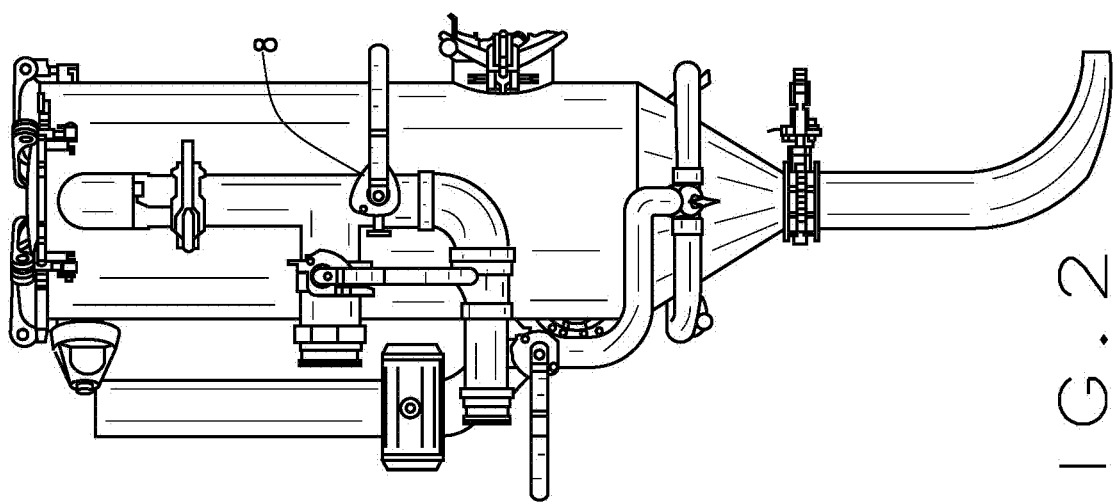
FIG. 2 is a front view of the filter assembly, of FIG. 1.

As can be noted in FIGS. 1-3, of the drawings, the filter assembly, of the vacuum type, is shown at 1, and such vacuum filter assembly of this invention provided for cleansing the air for use in the transfer of the bulk granular materials, such as food grade grains, in the conveying vehicles, such as a bulk tank trailer or railroad car, or other conveying vehicle, although not shown herein. It includes its filter canister or housing 2 which has a variety of air conveying lines operatively associated therewith, as to be fully explained. Generally, such a vacuum filter assembly, and its canister, is used for tracking, through the use of the air conveying blower (not shown), that attracts the dust laden air either from the silo, or from the tank trailer itself, when the grains are transferred from the silo to the bulk tank trailer, for conveyance, or for taking some air from the tank trailer and pressurizing it for use for conveying the grains out the bottom of such a trailer, when conveying the granular material to another location, such as a silo, for storage or usage. Initially, a vacuum connection 3 attaches with its shown port which is in communication with the tank trailer blower (as explained, not shown) that delivers the clean air by suction to the blower system, and generates that clean air through its passage within the filter provided within the filter canister 2, such as used for conveyance of the granular material either to or from the conveying vehicle, as explained. The vacuum control line is opened to allow the attraction of the dusty air into the filter canister tube, and there is an exhaust valve 4 that is opened to allow clean air to be sucked towards the blower, for further usage, after the dusty air has been drawn into the filter canister, to be subjected to its cleansing filtration process.

To load the vehicle trailer pneumatically, from the pressurized silo (not shown) holding the granular material, the vacuum control line is opened to allow the dusty air to be drawn into the filter canister, and the exhaust valve is opened to allow the clean air to be sucked out of the filter canister, and to the blower for its pressurization, and for application in the overall grain conveying process.

To recycle the dust collected as at the vicinity of the dust collection valve 5, provided at the bottom of the filter canister tube, its valve is opened and the canister is pressurized to fluidize the dust and allow it to be pneumatically conveyed either for disposal, or for collection back in the tank trailer, for further usage, since it will be a dust formed of grain material, itself. The dust collection valve 5 is opened, to remove the dust from the bottom of the canister, as can be understood. To aid in such, the canister has aerators that can be used as a dust collector, and an aeration control valve 6 is provided for that purpose.

To clean the filter elements, such as the plurality of filter tubes, to be subsequently described, a back flush valve 8 is opened allowing air to flow in the opposite direction through the filter, to unclog the emplaced filtration tubes, of the type as previously summarized and explained in this application, such tubes having those micron openings to function for filtration purposes, as can be understood. This unclogs the dust from within the filtering openings, allows the dust to drop to the vicinity of the dust collection valve 5, where it then can be removed as previously explained.

As previously reviewed, various types of actuators, to be described in greater detail, whether they be electronic controlled, or mechanically operated, can be fitted to the various identified valves, as described, and through the usage of a system of relays and switches, can control the valves through their automatic operations. Or, even a computer control can be used to fully automate the operations of the system, through its sequence of events, and which may be controlled from the dashboard in the vicinity of the vehicle operator, or located somewhere externally upon the filtration system, and be conveniently disposed to provide for an automated operations of the filtration system, during its usage.

As can also be seen in FIG. 1, there is a high pressure inspection door, as at 9, where visual inspection can be made interiorly of the filter canister 2, after curtailment of its operations, to see if its various operative components are in satisfactory condition, for further usage and application.

On the top of the filtration canister 2 is a high pressure cover 10, which can be locked into position by means of a series of cam locks 11 to assure that the cover remains intact during operations of the filtration system, even when subjected to substantially high pressures, during its functioning.

In other words, the concept of this vacuum filter assembly is to provide the usage and application of a vacuum port, that connects by conduit to a single blower, although a plurality of them may be used, that generates sufficiently high pressure vacuum, in the manner as previously described, for drawing soiled air into the filter canister, either from a silo, or from the tank trailer itself, for movement through the filtration system, and passing that air through the various porous filtration tubes, to separate any dust and debris, from the air, and then drawing the cleansed air to the blower, where it is forced into the conveying lines to aid in the removal of the granular material either to or from the conveying vehicle, during its operations. This assures that only unadulterated clean air is used in this conveying process, and does not soil the types of granular materials, such as grains, that are being conveyed, during its usage. Then, a back flush valve is utilized to provide for this reversing the flow of the pressurized air, when the filtration tubes are being subject to the reverse flow of the air, to remove any of the dust and debris, during their cleansing process, when that segment of the filtration system is rendered functional for further cleaning purposes.

As also noted in FIG. 3, there is a conduit connection 12 connecting with a conveying line 13, having a valve 34 operatively associated therewith, and this may allow for the transfer of air into the canister, for cleansing, and such conduit 13 may communicate with an upper segment of the tank trailer storage vessel, or to the silo, for bringing into the canister the soiled air for cleansing for further usage for the purposes of this invention.

As explained in the application, the vacuum filter canister is outfitted with control valves, to allow the filter to be operated in different modes. The canister can function as a vacuum filter, or has aerators to allow the canister to be pressurized to unload the dust into the trailer or silo. The canister can be used as a dust collector when pneumatically loading the trailer from a pressurized silo. Or, the canister can also have an outlet pressurized to pass air through the filter in the opposite direction to clean the filter elements, as required.

The various schematic diagrams showing the flow path for the air, granular materials, the operative components including the air filtration canister 2, the associated blower that moves the air, as at 35 and the structures that hold the granular materials, such as the dry bulk trailer T, the silo, railroad car, or the like, as noted at R and the destination silo, as at S, where the conveyed grain may be shipped and conveyed for storage, can be seen in FIG. 4. And, the various air flow lines, and granular material flow lines, can also be seen. For example, the blower has a vacuum inlet line 16 which brings the incoming clean air from the canister 2, due to the vacuum attraction provided by the blower, and the blower then can aid through the generated pressurized air in conveying the granular material to or from the silo R, by way of the airline 17. Or the pressurized air can aid in the conveyance of the grain to the destination silo S, by way of the conduit 19 when it is desired to clean out the filtration tubes of the filtration assembly, and its canister 2, the blower made direct its pressurized air by way of the airline 18 and enter it into the top segment of the canister 2, to provide for a reverse flow of pressurized air through the filtration system, in order to dislodge any dust or debris from within the filtration tubes, provided within said assembly.

When it is desired to transfer grain from the silo R, pressurized air may pass through the air line 17, into the top of the silo to aid in the transfer of the granular material into the dry bulk trailer T, by way of the conduit 20. This provides an overall analysis of the interrelated air flow lines, conduits, and the storage means, whether it be the tank trailer, the blower, silo, rail car, and filtration canister assembly 2, as can be understood.

Figure 5:
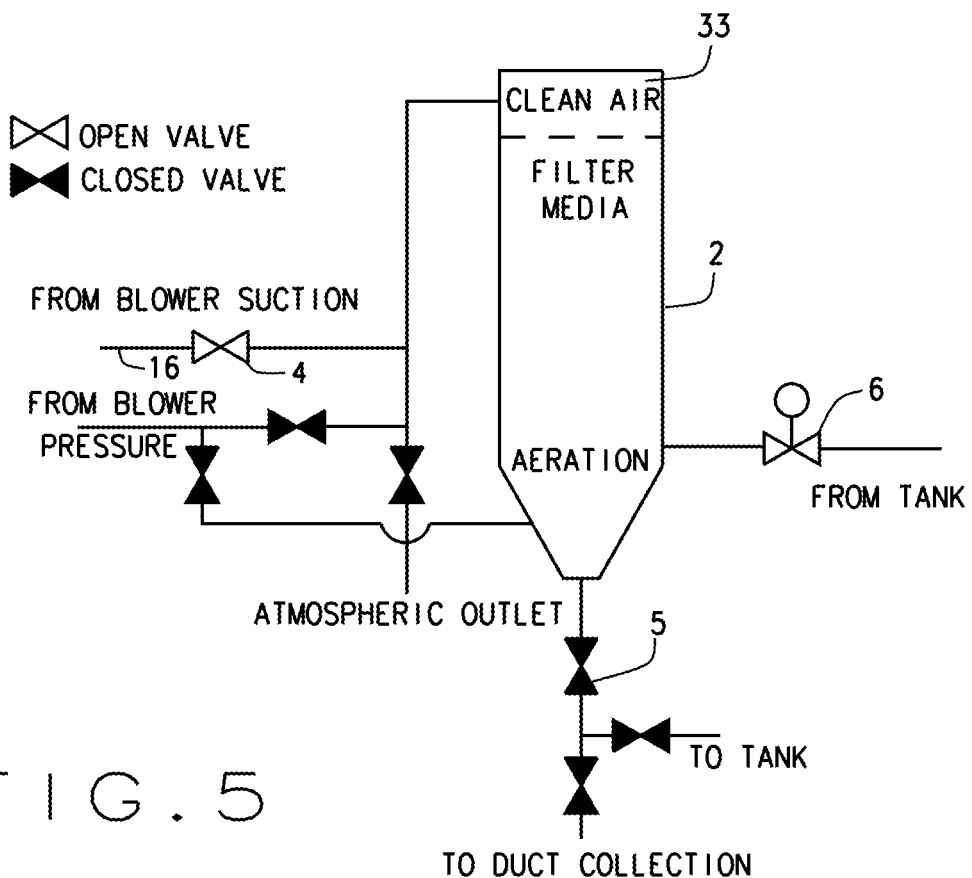
FIG. 5 is a schematic view of the various conveying lines, operatively associated with the filter canister, and the location of the various valving, that are associated with and provide for the sequence of operation for the vacuum loading of its associated tank trailer.

As can be seen in FIG. 5, the vacuum filter relationship is readily disclosed, showing the various valves, those that are opened, and those that are closed, in order to achieve the operations of the filter canister 2, within the system of the assembly. As can be noted, the vacuum line 16 with its valve 4 connect with the upper segment of the canister 2, for attracting the clean air out of the filter, from its filter media, for use for further purposes, such as for aiding in the conveyance of the grain to another location, such as the destination silo. That valve 4 is opened, at that time. The incoming airline, and its valve 6, connect into the bottom of the canister 2, and attract the dust laden air from either the silo, the tank trailer, or the like, for bringing such air into the filtration assembly to be cleansed. At this time, the various dust collection valves are all closed, as noted at FIG. 5, while the filtration assembly is performing its operations. Thus, to load the trailer, the vacuum port is connected to the vacuum port on the blower, as noted. The vacuum control line is opened to allow dusty air into the canister, as stated, and the blower suction valve is opened to allow clean air to be sucked to the blower, for further processing in the operations of the overall system.

Figure 6:
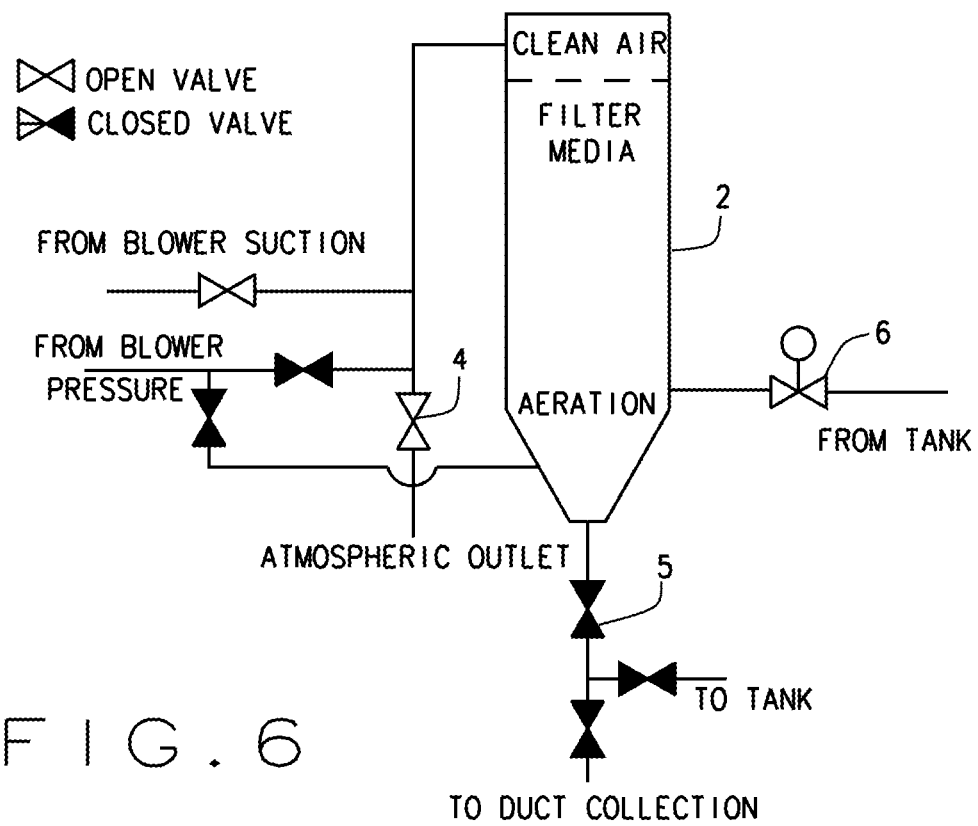
FIG. 6 provides a similar view to that of FIG. 5, but also shows the overall schematics for the filter canister, and its various conveying lines, with operating valves, that provide for the pressure loading of granular material from, for example, a silo, et al, and to the tank trailer as during its loading.

The usage of the system for pressure loading of granular material, to or from the tank trailer, can be noted in FIG. 6. In this embodiment, to load the trailer pneumatically, such as the trailer T, as from a pressurized silo, such as noted at R, previously, the vacuum control line, through its valve 6, is opened, and air is allowed to enter into the canister 2, furnishing clean air, and which clean air is then used to assist in the conveyance of the grain, and at the same time the exhaust valve 4 is opened, and allows clean air to be discharged to the atmosphere, if desired. All of the other valves, during this procedure, are closed, as can be noted.

Figure 7:
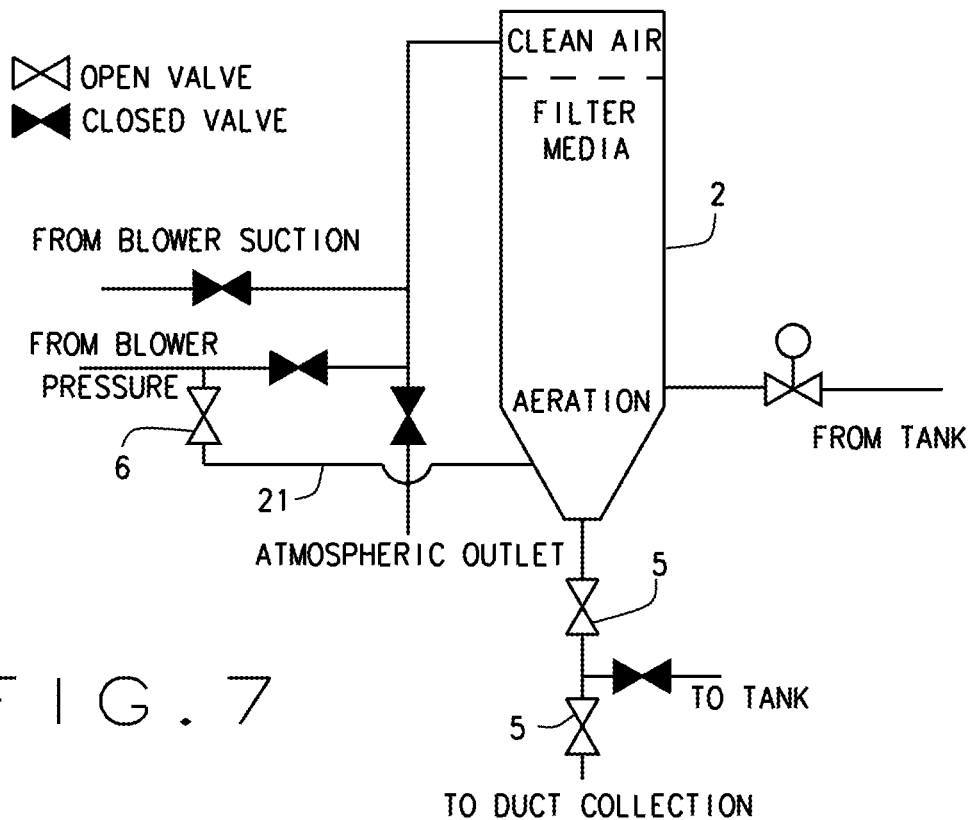
FIG. 7 shows a schematic view of the filter canister, its various air lines, and the location of the various valving that is utilized to provide for dust recycling, that dust which has been removed from the incoming air, through the use of the filter tubes of the filtration canister during its functioning.

To achieve dust recycling, such as to return the dust either back into the tank trailer, the silo, or to deliver it for collection, reference is made to FIG. 7. This shows the various valves 5 are opened at the bottom of the canister 2, and any dust collected there will be discharged, with the aid of the pressurized air from the blower, as along the flow line 21, as can be noted. All of the other valves are closed during the performance of this procedure. Hence, to recycle the dust collected during loading, the aeration valve 6 is opened, and the canister is pressurized to fluidize the dust and allow it to be pneumatically conveyed, and the dust collection valve 5, as stated, is opened to remove the dust from the canister. This is all the dust that has collected in the bottom of the canister 2, or where the canister has been purged, by reverse flow of pressurized air, to dislodge such dust from the filtration tubes, which would be deposited into the bottom of the canister, and removed in the manner as described herein.

Figure 8:
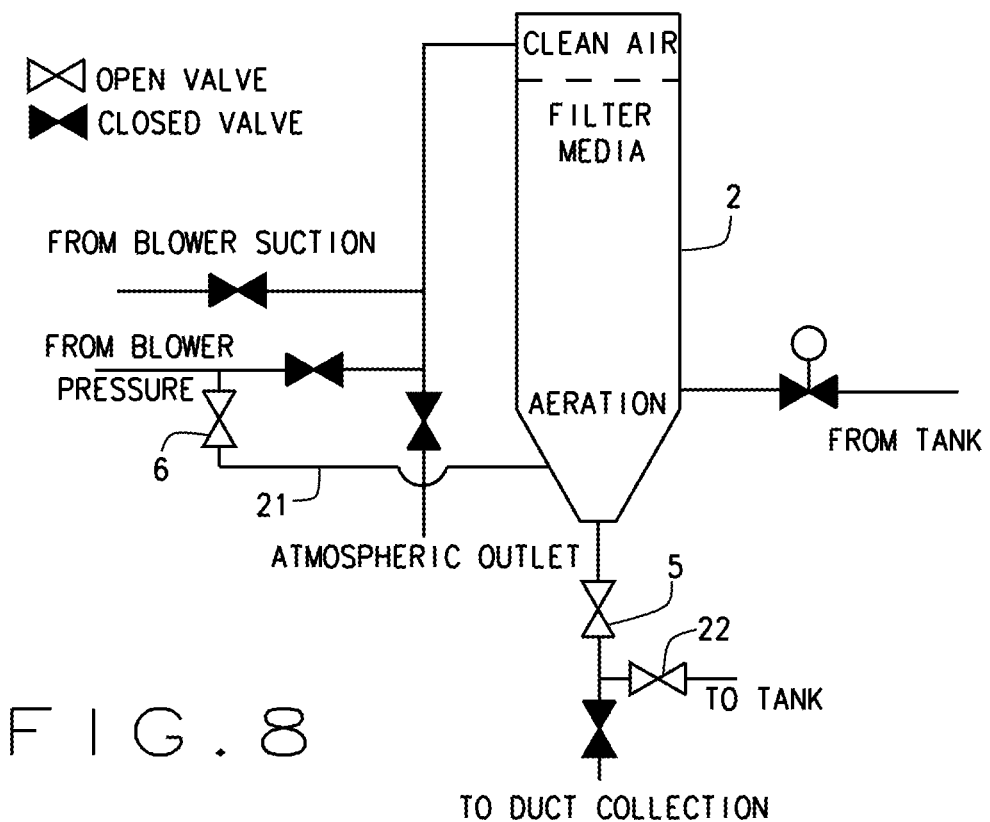
FIG. 8 shows a schematic view of the filter canister, the various air lines, and the valving utilized to provide for dust recycling, as for its return back to the tank trailer from which the soiled air was obtained, as during operations of the filtration system of this invention.

Similar procedure relating to dust recycling, as returning the dust, which may be a grain dust, back into the tank trailer, or the silo, can be seen in FIG. 8. In this instance, the pressure from the blower passes through the valve 6, the conduit line 21, and into the bottom of the canister 2, which forces the dust down through the valve 5, which is opened, and then through an additional valve 22, for conveyance of such dust back into the tank, the tank trailer, the silo, or the like, for recollection. Thus, to recycle the dust collected during loading, the aeration valve is opened and the canister pressurized to fluidize the dust and allow it to be pneumatically conveyed. The tank return valve, as at 22, is opened, to remove the dust from the canister, as can be understood.

Figure 9:
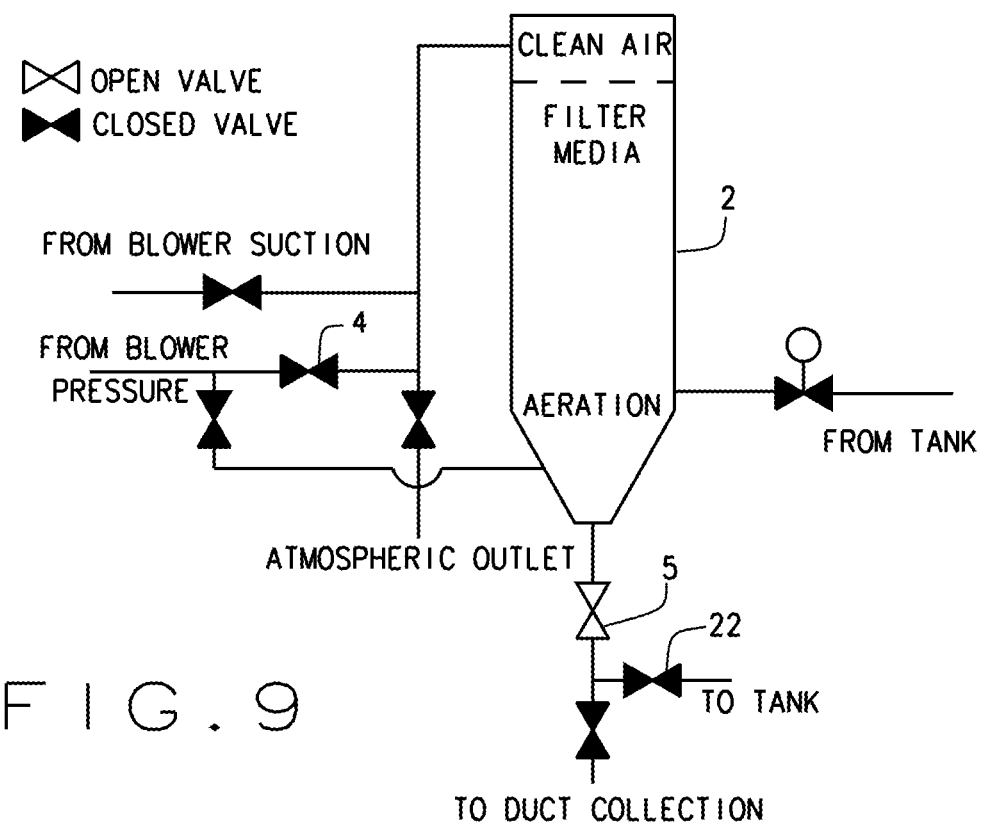
FIG. 9 shows the filtration canister, its various air lines, and valving structures, that are manipulated to provide for a back flush of air into the filter canister, to clean the filtration tubes when they have become clogged with dust, after prolonged operations.

In order to provide for that cleaning of the filtration tubes within the canister 2, reference is made to FIG. 9. In this instance, the air line from the blower passes through the valve 4, and enters into the top of the canister 2, and is directed downwardly into its various filtration tubes, identified as filter media, and back flows through the said tubes, to dislodge any dust particles from within the filtration tubes, and direct the same down towards the bottom of the said canister. At this time, after cleansing has taken place, the valve 5 is opened, the valve 22 is likewise opened, and directs the collected dust back into the tank trailer, or other storage bin, holding the granular material. Hence, to clean the filter element the back flush valve 4 is opened, allowing air to run in the opposite direction through the filters, in order to unclog the same.

Figure 10:
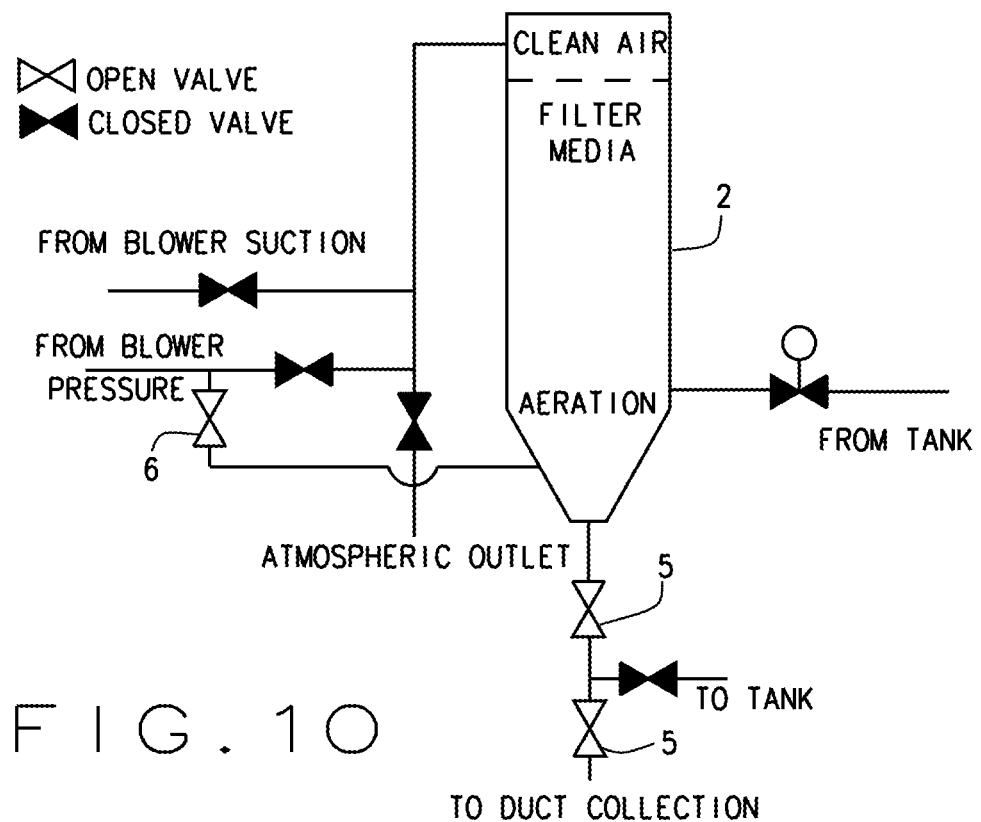
FIG. 10 shows a schematic view of the filter canister, its various valving, and those valves which are opened to provide for a cleansing of the filter elements, or its filter tubes, that allows pressure to back flush through the filtration tubes to obtain their cleansing for further usage.

To provide for a further cleansing of the system, the line from the blower passes through the valve 6, and again into the bottom of the canister 2, directs the dust downwardly through its line and past the opened valve 5, and then through the lower valve 5, to provide for the dust collection, without conveying it back to any storage tank. (See FIG. 10) Hence, to clean the filter elements the aeration valve is opened allowing pressure to build up in the canister. After approximately a 5 psi has built up in the canister, the outlet valve 5 is opened. The pressurized air creates a flow in the opposite direction across the filters and back flushing the filters, depositing the dust downwardly, which is then collected through the various valves and conveyed to a collection location, or for disposal.

The foregoing provides an analysis of the various air lines, grain conveying lines, dust passing lines, the various valves that can be manipulated to provide for the sequencing of operations of the system, whether it be for cleansing air, using pressurized air to flush out the filtered dust, and for conveying such particles to other locations for storage or collection.

Figure 11:
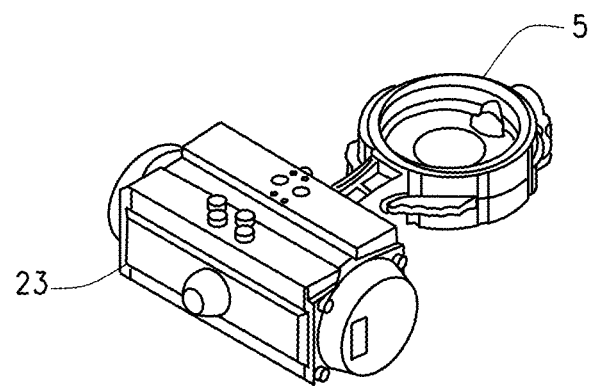
FIG. 11 shows an actuator, used in association with each of the various valves, or butterfly valves, and which may be automatically operated, electronically, when performing a loading or unloading function of the tank trailer during its operations.
Figure 15:
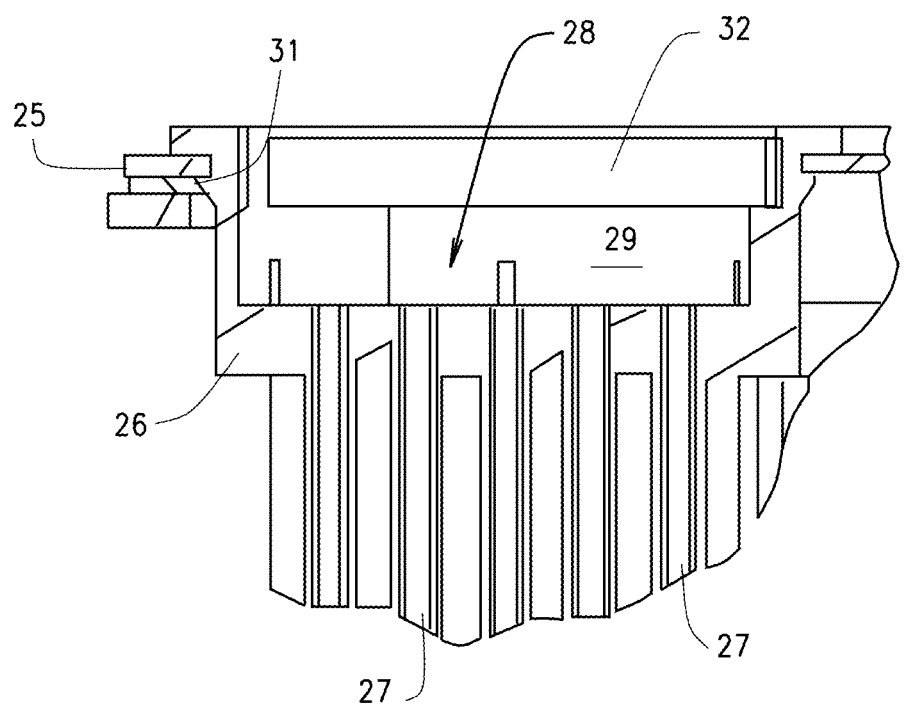
FIG. 15 provides a partial sectional view taken through the upper segment of the filter tube pod assembly, as taken along the line 15-15 of FIG. 14.
Figure 14:
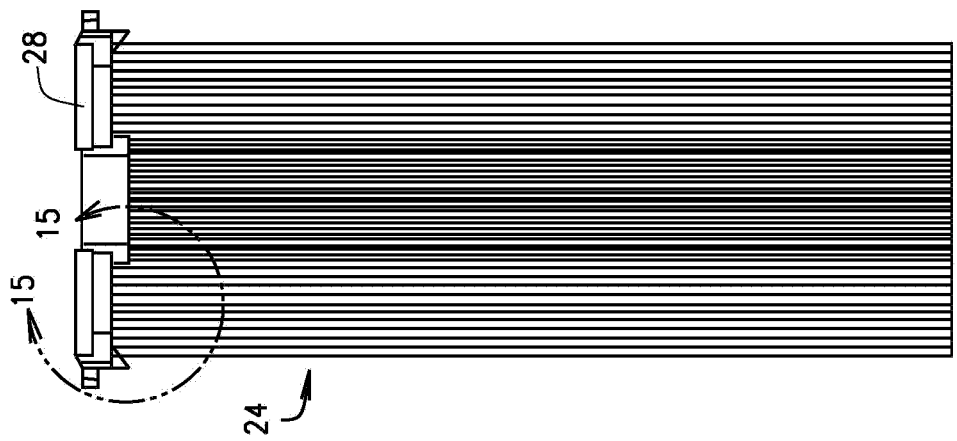
FIG. 14 provides a sectional view of the filter tube pod assembly, taken along the line 14-14 of FIG. 13.
Figure 13:
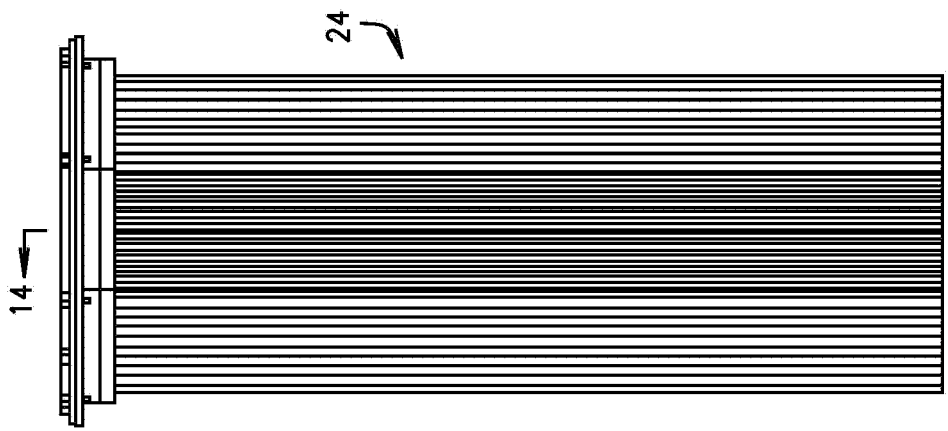
FIG. 13 provides a front view of the filter tube pod assembly of FIG. 12.
Figure 12:
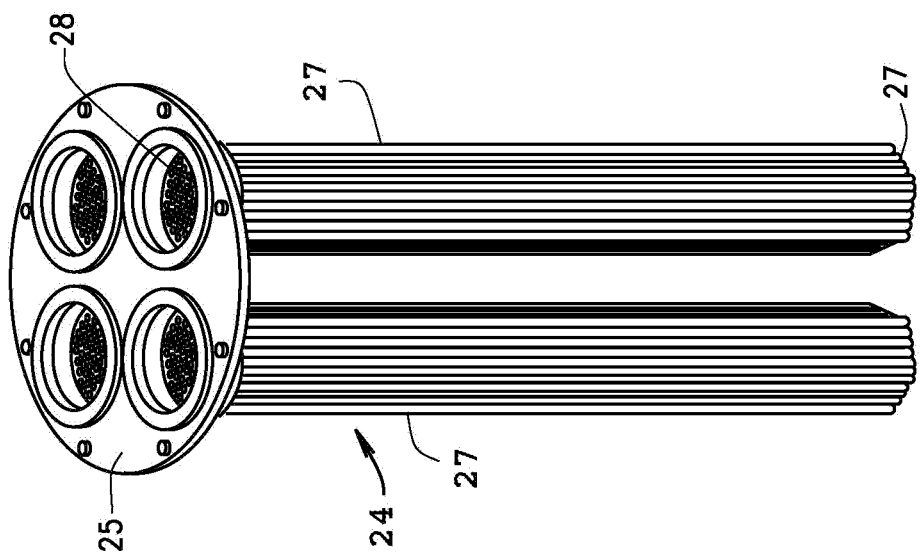
FIG. 12 provides an isometric view of the arrangement of filter tube pods, four in number, mounted upon its upper plate, when assembled into the filter canister of this invention in preparation for usage.

As previously reviewed, various types of actuators, whether they be electronically controlled, or mechanically operated, or in a combination of such, can be fitted to the various valves, as described, and through the usage of a system of relays and switches, can control the valves for automated operations. This can be seen in FIG. 11. Or, even a computer controller can be used to fully automate the operations of the system, in sequence, which may be controlled from the dashboard in the vicinity of the vehicle operator, or even conveniently located somewhere externally, upon the filtration system, to automate the operations of the filtering device, during its usage. This can be seen in FIG. 11, where a valve such as any one of the valves 4, 5 or 6, can be connected with an actuator 23 which can provide for the opening and closing of the butterfly valve 5, or any of the others, during their operations. All of this may be computer controlled, and operated in series, through the efforts of the operator in performing the various tasks incorporating the filtration system of this invention. Such actuators can be fitted to the valves, as noted. The actuators could then be opened or closed with switches allowing the operator to configure the filter for use with a selector switch. Turning a switch on would power the actuators needed to be operated for each valve operation. Or, a computer control can be used to fully automate the operation. A computer control system would use sensors for the pressure in the filter canister as well as the differential pressures across the filter elements to automatically pause loading/unloading when the filters were clogged by detecting the increase in pressure differential. Then, a cleaning cycle automatically will back purge the filter elements until the back pressure is reduced, meaning the filter elements have been significantly cleansed.

Another aspect of this invention is to provide for the convenient mounting of the various filtration tubes, generally within pod type configurations, that greatly facilitates their installation, removal, or replacement, when the filter assembly requires servicing. As can be seen in FIGS. 12-15, the various filter tube pod assemblies 24 are readily noted. As can be seen, in this particular instance, the transverse plate 25 mounts four pod installations 24 within its structure. Each pod contains a plurality of the filtration tubes, as noted at 27, structured in the manner as summarized herein, and as previously described in detail, in earlier related applications. This filter assembly uses the tube pods that mount the porous plastic filter tubes, at their top ends, as noted at 28, the upper ends of the tubes are encapsulated within a polymer, such as, for example, a urethane type of material, that is employed for potting such tubes into a collective embodiment. The pods allow the same type of filtering area as efficiently as a standard assembly of filter tubes, which may be individually mounted to a transverse plate, as described in previous assignee patents, but when the tubes are needed to be removed for cleaning or replacement, as stated, in this particular instance, there are only four pods to remove, instead of 250 individual filtration tubes, and their grommets, as previously provided by the assignee. Thus, whether you have four pods, two pods, eight pods, or any number of pods, of collected filtration tubes, this does facilitate the processing and servicing of such a filtration assembly, during its sustained usage.

As can be noted, the potting urethane material, which forms kind of a header, as noted at 26, mounts the various tubes 27, and provides an upper air space 29 into which the cleansed filtered air enters, as it is then conveyed upwardly for removal through the air conduit 30 through the efforts of the blower 15, as it passes through the air line 3, during usage of the device. The upper end of the header 26, can snap into position within the transverse plate 25, as noted at 31, while the upper portion of the header 26 contains a spring type band 32 which forces the collectable top of the polymer header against the tube sheet, or the transverse plate 25, to provide structural support for the device, in its mounting, and when exposed to high pressures. Then, the filtered air that passes up through the filtration canister 2, enters into the clean air compartment, above each pod, as can be noted at 33 in FIG. 5, and then passes through that air line 30, for further usage and application, as previously reviewed.

Then, on top of the entire canister is the lid 10, that closes off the clean air spacing, as can be understood.

The potting of the various tubes within the urethane potting material, forming the header 26, assures that such tubes will not be dislodged by any of the pressurized air that the filtration assembly encounters, during its sustained and continuous usage within the system of the tank trailer, for use for conveying such grains or granular materials, during their usage and applications.

Variations or modifications to the subject matter of this invention may occur to those skilled in the art upon review of the development as provided herein. Such variations, if within the spirit of this invention, are intended to be encompassed within the scope of any claims to patent protection issuing herein. The explanation of the invention in the Description of the Preferred Embodiment, and its specific structure for achieving of its beneficial results, and as depicted in the Drawings, are generally set forth for illustrative purposes only.

We claim:

1. A dust filtering and collection system for use in moving granular material by air conveying, comprising:
   a housing, said housing having an upper end and a lower end, and an air inlet on the housing positioned on the lower end of the housing, and an air outlet on the housing positioned on the upper end of the housing;
   a dust filtering system within said housing, said dust filtering system comprising a transverse plate positioned in an upper interior of said housing, and a pod suspended from the transverse plate and extending downwardly into a lower interior of said housing, the pod comprising a header that encapsulates and supports upper ends of a plurality of filter tubes, and provided for holding the plurality of filter tubes suspended from the transverse plate;
   a vacuum connection connected to said housing, said vacuum connection connecting with a blower assembly, said air inlet provided for delivery of dust laden air into the housing, such that when said blower assembly is actuated, said blower assembly provides for generating a vacuum within the housing that draws dust laden air into the air inlet on the housing, and drawing the dust laden air into the dust filtering system, to provide for cleansing of the air and passage to the blower for then aiding in the air conveyance of the granular material, during its functioning.

2. The dust filtering and collection system of claim 1, and including a back flush valve provided connecting with the vacuum connection, to provide for a reversal of pressurized air through the housing of the filtering system to extract any accumulated dust particles from the pod of filter tubes and to provide for further efficient generation and application and usage of the conveying air.

3. The dust filtering and collection system of claim 1, wherein the pod is one pod of a plurality of pods on the transverse plate and there are a plurality of filter tubes suspended from each pod header.

4. The dust filtering and collection system of claim 1 and including a high pressure inspection door provided through the housing to allow for visual inspection to be made of the interior of the housing following curtailment of its operations.

5. The dust filtering and collection system of claim 2, wherein the air inlet having a butterfly valve to control its operations, the air outlet incorporating a butterfly valve to control its operations, the vacuum connection of the air inlet being controlled by the butterfly valve, and the back flush valve comprising a butterfly valve, and all of said butterfly valves being controlled by actuators, and said actuators being electronically controlled through the application of a computer control that fully automates the operation of the system during its usage.

6. A dust filtering and collection system comprising:
   a filter canister housing;
   a conveying line connected to the filter canister housing and communicating with a lower interior of the filter canister housing;
   an air conduit connected to the filter canister housing and communicating with an upper interior of the filter canister housing;
   a transverse plate in the filter canister housing between the lower interior and the upper interior of the filter canister housing; and
   a pod comprising a header that is positioned in an opening in the transverse plate with the header positioned in the upper interior of the filter canister housing, and the pod comprising a plurality of filter tubes having top ends encapsulated in the header with the plurality of filter tubes suspended by the header and the transverse plate in the lower interior of the filter canister housing.

7. The dust filtering and collection system of claim 6, further comprising:
   the pod being one pod of a plurality of pods with each pod of the plurality of pods comprising a header that is positioned in an opening in the transverse plate and with each pod of the plurality of pods comprising a plurality of filter tubes suspended in the lower interior of the filter canister housing.

8. The dust filtering and collection system of claim 6, further comprising:
   the header of the pod is configured for snapping into position in the opening in the transverse plate.

9. The dust filtering and collection system of claim 6, further comprising:
   a spring band in the header of the pod, the spring band being configured for urging the header into engagement against the transverse plate from the opening in the transverse plate.

10. The dust filtering and collection system of claim 6, further comprising:
    the header of the pod being configured for attachment to the transverse plate in the opening in the transverse plate and simultaneously suspending the plurality of filter tubes in the lower interior of the filter canister housing.

11. The dust filtering and collection system of claim 6, further comprising:

the header of the pod being configured for removable attachment to the transverse plate in the opening in the transverse plate where removal of the header from the opening in the transverse plate simultaneously removes the plurality of filter tubes suspended by the header from the transverse plate.

12. A dust filtering and collection system comprising:

a filter canister housing;

a conveying line connected to the filter canister housing and communicating with a lower interior of the filter canister housing;

an air conduit connected to the filter canister housing and communicating with an upper interior of the filter canister housing;

a transverse plate in the filter canister housing between the lower interior and the upper interior of the filter canister housing, the transverse plate having a circular configuration with a center and having a plurality of openings through the transverse plate with the plurality of openings being spatially arranged around the center of the transverse plate; and a plurality of pods with each pod comprising a header that is positioned in an opening of the plurality of openings in the transverse plate with the header positioned in the upper interior of the filter canister housing, and each pod comprising a plurality of filter tubes having top ends encapsulated in the header with the plurality of filter tubes suspended by the header and the transverse plate in the lower interior of the filter canister housing.

13. The dust filtering and collection system of claim 12, further comprising:

the header of each pod is configured for snapping into position in an opening in the transverse plate.

14. The dust filtering and collection system of claim 12, further comprising:

a spring band in the header of each pod, the spring band being configured for urging the header into engagement against the transverse plate from an opening in the transverse plate.

15. The dust filtering and collection system of claim 12, further comprising:

the header of each pod being configured for attachment to the transverse plate in an opening in the transverse plate and simultaneously suspending the plurality of filter tubes on the header in the lower interior of the filter canister housing.

16. The dust filtering and collection system of claim 12, further comprising:

the header of each pod being configured for removable attachment to the transverse plate in an opening in the transverse plate where removal of the header from the opening in the transverse plate simultaneously removes the plurality of filter tubes suspended by the header from the transverse plate.

* * * * *